US007142410B2

(12) United States Patent
Norris et al.

(10) Patent No.: US 7,142,410 B2
(45) Date of Patent: Nov. 28, 2006

(54) TRANSFORMER WITH HOUSING AND SWITCH GEAR

(75) Inventors: Ian H. Norris, Stoney Creek (CA); Michael L. Bullis, Calgary (CA); Brian F. Klaponski, Winnipeg (CA); Winston R. Madray, Winnipeg (CA); Floyd E. A. Engel, Peterfield (CA)

(73) Assignee: Carte International Inc., Winnipeg (CA)

( * ) Notice: Subject to any disclaimer, the term of this patent is extended or adjusted under 35 U.S.C. 154(b) by 289 days.

(21) Appl. No.: 10/893,310

(22) Filed: Jul. 19, 2004

(65) Prior Publication Data

US 2006/0012948 A1 Jan. 19, 2006

(51) Int. Cl.
*E04H 5/04* (2006.01)
*H02B 5/00* (2006.01)

(52) U.S. Cl. ...................... 361/603; 361/602; 361/605; 361/620; 361/621; 361/623; 200/48 R; 174/50; 312/223.3; 312/223.6

(58) Field of Classification Search ................ 361/601, 361/602, 603, 605, 620–625, 641, 679, 333, 361/736; 312/223.31, 223.6, 216; 174/38, 174/50, 59, 52.6, 58; 336/90; 49/142; 206/386; 439/92; 307/150
See application file for complete search history.

(56) References Cited

U.S. PATENT DOCUMENTS 3,014,158 A * 12/1961 Nelson et al. .............. 361/141
5,715,134 A * 2/1998 Maineult et al. ............ 361/604
6,233,137 B1 * 5/2001 Kolos et al. ................ 361/603
6,657,123 B1 * 12/2003 Moore .......................... 174/50
6,770,810 B1 * 8/2004 Wiebe et al. ................. 174/50

FOREIGN PATENT DOCUMENTS

DE 010336910 A1 * 4/2004

* cited by examiner

*Primary Examiner*—Michael Datskovskiy
(74) *Attorney, Agent, or Firm*—Adrian D. Battison; Michael R. Williams; Ryan W. Dupuis

(57) ABSTRACT

A transformer is formed by a housing having a main transformer compartment, a first compartment for the input terminals for the main power supply, a second compartment for the output terminals to supply the load and a third compartment for a manually operable switching unit, where each of the compartments is maintained separately from each of the others and each has a manually openable interlocked cover which can be opened to provide access to an interior of the respective compartment. The switch assembly has switch contacts mounted within a switch container located within the third compartment and a manually operable member mounted one on side wall located within the third compartment outside the switch container for moving the switch contacts between open and closed positions. The switch container has a transparent window in a wall thereof through which the contacts can be observed and an insulating liquid bath maintained separate from an insulating liquid bath for the transformer assembly.

13 Claims, 5 Drawing Sheets

TRANSFORMER WITH HOUSING AND SWITCH GEAR

BACKGROUND OF THE INVENTION

Transformers serve an integral role in the delivery of electrical power from generation sources to specific point of use applications. Whether dry-type or liquid-filled, single-phase or three-phase, a wide variety of transformer types are often involved in the transformation of power throughout the electrical system, ultimately providing available power for consumption.

There are many different applications for transformers. The type of transformer utilized for a specific requirement is often dictated by the service conditions and the amount of power required for a particular application. Focusing on liquid-filled transformers only, small residential loads quite often use single-phase transformers mounted overhead or a completely tamperproof version mounted at ground level. Larger commercial or industrial loads could use larger single-phase transformers or could deploy smaller three-phase transformers to reduce the voltage down to usable levels. These products could be overhead, pad mounted (completely tamperproof design), small power type (typically mounted on a concrete pad but must be fenced to prevent public access) or submersible style. Submersible products are often used only in high density load centers where there is insufficient real estate for pad mounted transformer installation. Very large loads require the use of medium power or large power transformers.

Carte International manufactures a broad range of liquid-filled transformer products for the utility, commercial and industrial market sectors primarily within North America.

Certain commercial and industrial loads often require large amounts of electricity and in many cases the users opt to purchase power at a higher voltage and conduct their own voltage transformation, with all the necessary controls and safety aspects such that the power can be purchased at a lower rate. In these cases, switch gear is typically utilized to provide the user the ability to turn the power off and to isolate their load from the electrical system.

Switch gear is comprised of a circuit breaker or a switch which enables the power to be on (or flow through the circuits connected to it) or off (effectively isolating the transformer and any downstream circuits from the electricity source). These switches often have a visible switch mechanism to enable equipment operators to positively see when the breaker (or switch) contacts are open (de-energized) and when they are closed (energized). Switch gear often features a wide variety of control equipment and protective equipment to further enhance the safe operation of the equipment to assist in monitoring power consumption by the user. Fusing and arresters may be included as additional protective equipment in some switch gear designs to guard downstream equipment and components from electrical surges. One of the key aspects of switch gear is that no live high voltage parts are exposed. While switch gear is often not entirely tamperproof, metal enclosures are grounded and mechanical interlocks are often used to prevent inadvertent opening of switch gear compartments which are energized by lesser trained equipment operators.

There are many benefits for closely grouping transformers and switch gear at a commercial or industrial installation as the switch gear is typically closely coupled or attached to the transformer and controls the power that the transformer provides to the site load.

In the early 1990's, Carte embarked a new product line which married basic switch gear with a pad mounted transformer. The resulting product, which is called a Primary Service Entrance Transformer or PSET, is an integrated substation designed for commercial or industrial applications where primary power (at lower rates) is being purchased for consumption. The PSET product concept basically combined the pad mounted transformer with a high voltage fused load break (air-break) disconnect switch all within a tamperproof enclosure. As the product is tamperproof, it may be installed in public access areas and not require a fenced enclosure to contain the equipment.

The high-voltage equipment with the PSET can be operated safely by non-Utility personnel. The design of the PSET has received electrical inspection authority approval (in certain jurisdictions) and, as such, allows the end-user to employ maintenance staff to perform several tasks without having to contact the local electric Utility. One of the key features of the PSET is that the contacts of the air-load break switch must be visible by the operator. In essence, the operator must ensure that the contacts are open prior to any work being done on the equipment or circuits originating from the PSET.

The PSET transformer is physically much smaller than a fenced substation. The PSET requires only a single concrete pad for mounting the equipment versus multiple pads (and perhaps a fenced enclosure) when conventional components are utilized. The PSET is designed to be delivered to the job-site as an integral package that does not require assembly of various component parts.

Because the equipment is packaged direct from the factory, the PSET design offers significant cost savings to the buyer versus a conventional transformer and switch gear arrangement. Size and space requirements at the installation site will be reduced as the typical practice of on-site mating of the transformer and switch gear is eliminated. Site labor is also reduced since the PSET is delivered with all necessary transformer/switch gear interconnections completed.

SUMMARY OF THE INVENTION

It is one object of the present invention to provide an improved transformer of the above general type.

According to the invention there is provided a transformer comprising:

a housing having a main transformer compartment, a first compartment, a second compartment and a third compartment, where each of the compartments is maintained separately from each of the others;

each of the first, second and third compartments having a separate manually openable cover which can be opened to provide access to an interior of the respective compartment;

input terminals mounted in the interior of the first compartment of the housing and covered by the cover thereof for receiving an input voltage from a supply;

output terminals mounted in the interior of the second compartment of the housing and covered by the cover thereof for providing an output voltage to a load;

a transformer assembly mounted in the main transformer compartment of the housing for converting the input voltage to the output voltage;

a switch assembly mounted in the interior of the third compartment and covered by the cover thereof for switching off and on supply of power from the input terminals to the transformer assembly to switch off and on supply of voltage to the output terminals;

the main transformer compartment including an insulating liquid bath for the transformer assembly;

the switch assembly including switch contacts mounted within a switch container located within the third compartment and a manually operable member for moving the switch contacts between open and closed positions located within the third compartment outside the switch container;

the switch container having a transparent window in a wall thereof through which the contacts can be observed from a location outside the housing through the cover of the third compartment when the cover is opened;

the switch container containing an insulating liquid bath for the switch contacts;

the switch container being separated from the transformer compartment by at least one bulkhead such that the insulating liquid bath of the switch container is maintained separate from the liquid bath of the transformer.

Preferably there is provided a bulkhead between the switch container and the transformer compartment which defines the switch container on one side and the transformer compartment on the other side with 3 bushings through the bulkhead to which connecting cables are attached from the switch contacts and connecting cables are attached from the transformer.

Preferably the bulkhead is vertical.

Preferably the input terminals are mounted on a bulkhead of the switch compartment with a bushing extending through bulkhead, a first electrical connector extending from the input terminals and a second electrical connector extending through the switch compartment from the bushing to the switch contacts.

Preferably the input terminals are mounted on a bulkhead of the switch compartment with bushings extending through the bulkhead, a first electrical connector extending from the input terminals and a second electrical connector extending through the switch compartment from the bushing to the switch contacts and wherein the bulkhead of the switch compartment on which the input terminal are mounted is parallel to the bulkhead between the switch compartment and the transformer compartment and spaced therefrom.

Preferably there are no live electrical components in the third compartment so that the manual operable member can be grasped manually.

Preferably the cover on the second compartment is interlocked with the switch contacts such that the cover can be opened and maintained open only with the switch contacts in the open condition.

Preferably the second and third compartments are arranged side by side.

Preferably each of the second and third compartments includes a top lift cover which is interlocked with the switch contacts such that the top lift cover can be opened and maintained open only with the switch contacts in the open condition.

Preferably there are provided control elements for the transformer which are located in the second compartment.

Preferably the manually operable member is mounted on a side wall of the switch container within the third compartment.

Preferably a front panel of the switch compartment comprises a panel bolted onto an open front face of the switch compartment, the panel having a transparent window formed therein.

The transformer disclosed herein is the next generation of Primary Service Entrance Transformers (PSET Transformers). The product incorporates the most fundamental requirements of the PSET package design into a new transformer product which improves the functionality while significantly reducing the overall size of the equipment. The product design uses available components to create a transformer package retaining the switching capabilities and operating practices common to the PSET. The product is completely tamperproof, meeting or exceeding established standards and requirements for enclosure integrity of pad mounted transformers.

The product preferably includes the key elements of the PSET Transformer design:

On-off switch with load break capabilities,

Primary lightning arresters, and

Primary fusing all contained with the tamperproof cabinet design

The ability to fuse the product utilizing commonly used 2-fuse system depends on the transformer size and the primary voltage. Larger transformers or transformers of higher voltage may be fused with clip-mounted primary fuses within a dedicated fuse cabinet.

The most salient feature of the transformer disclosed herein is the use of a 3-phase under oil load break switch in a manner in which the switch contacts are visible (as shown below). A viewing window allows the user/operator full visibility of the oil-immersed switch contacts.

The switch is contained within a dedicated switch compartment. The switch compartment contains its own fluid and is completely isolated from the fluid of the main transformer tank. The interior of the switch compartment of the transformer may be painted white to enhance the visibility of the switch contacts. Primary bushings are also installed into the switch compartment to maintain the separation of the switch from the main tank. An oil-to-oil bushing electrically connects the switch compartment to the main transformer tank, the core and coil assembly and the primary fusing.

The load break switch could be a 2-position (on-off) or possibly a 3-position switch (on-off-ground), depending on the user's operational practices and preferences. The load break switch is a type which is commonly used in the industry and for which many years of working experience have been gained. Most recent load break switches would be incorporated into the product, as the newer switches have higher interrupting ratings.

The load break switch is preferably modified to provide an interlocked switch index plate, which enhances the safety aspects of the equipment package. There are two key interlocks that are used to establish very clear and safe operating conditions. The index plate of the load break switch and the low voltage door both feature key interlocks.

The load break switch index plate is preferably designed in such a way that the key from the load break switch interlock can not be removed unless the load break switch is in the de-energized position. This is a Type F interlock. The second interlock is incorporated into the low voltage door and flip-top cover of the cabinet design. The second interlock is a Type D interlock. In order to open the second interlock (on the low voltage door), the key from the first interlock (on the load break switch) must be removed. By having the interlocks share the same key in this manner ensures that the low voltage door and flip-top of the cabinet can not be opened unless the primary load break switch is in the de-energized position.

The product preferably features three separate doors for access to equipment and accessories. Pad mounted transformers conventionally use two doors in their design. The advantage of the third door with the product is that the switch compartment may be accessed and the switch operated without the other doors being opened first by using key interlocks This is an operational safety feature for customers as they can then limit who may have access to certain parts of the product for routine maintenance or for emergency situations. The door on the switch compartment allows full access only to the switch handle, the viewing window (for visibility of the switch contacts), and the various gauges and couplings. The various gauges and couplings are used for standard field maintenance of the transformer.

Multiple configurations are possible and likely depending applications and user's preferences. Units having multiple load break switches are possible. Single-phase (likely larger kVA size) could be specified. As mentioned above, clip-mounted primary fusing may be attractive for certain applications.

One of the key advantages which can be obtained is a significantly smaller overall dimensions and smaller equipment footprint. In one example, the product may be 89" deep (including the radiators)×71" high×81" wide. A smaller footprint for the equipment will mean that a smaller mounting pad is required versus a PSET transformer; this will translate into lower installation costs.

BRIEF DESCRIPTION OF THE DRAWINGS

One embodiment of the invention will now be described in conjunction with the accompanying drawings in which.

DETAILED DESCRIPTION

Figure 1:
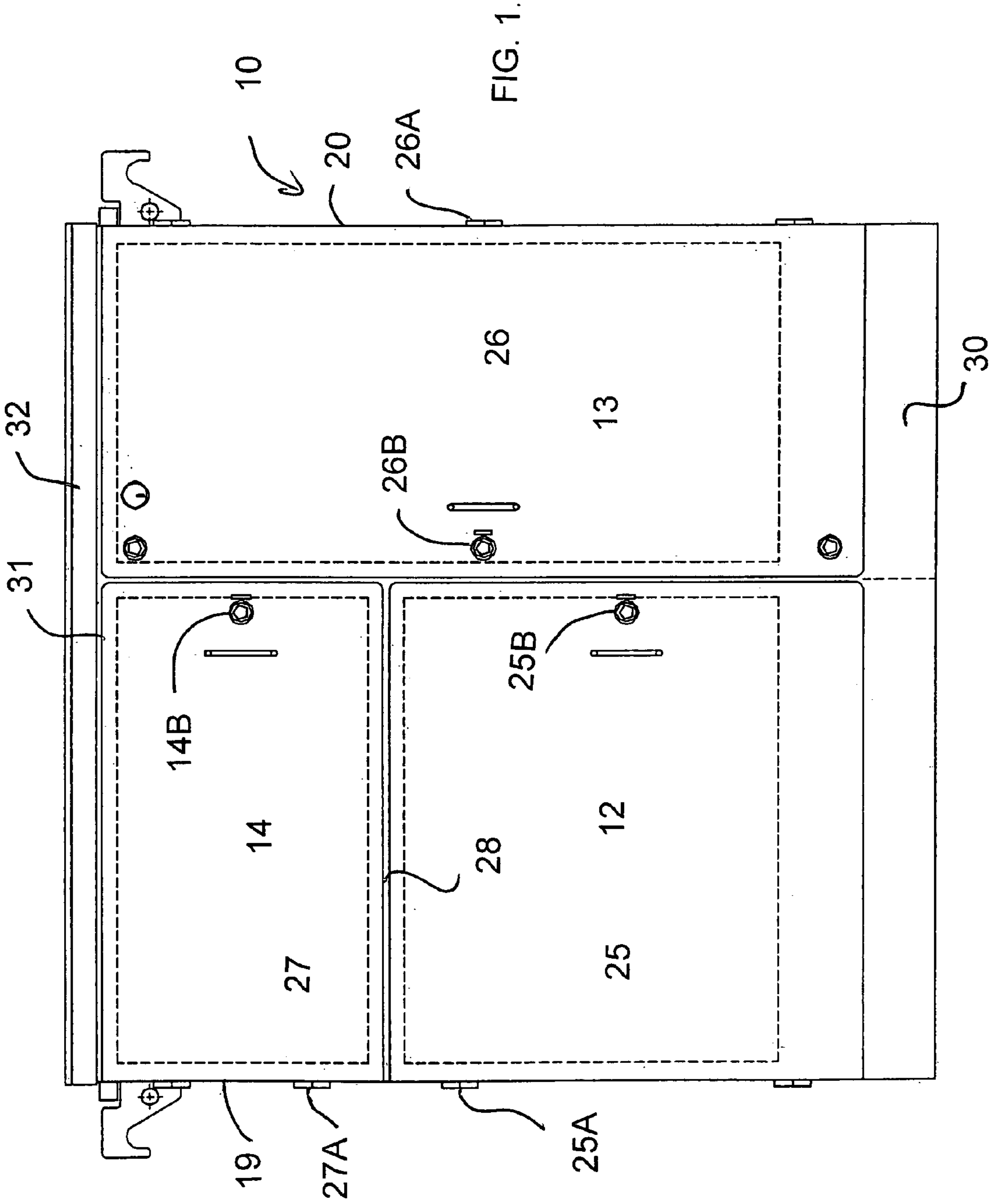
FIG. 1 is a front elevational view of a transformer and switch gear according to the present invention.
Figure 2:
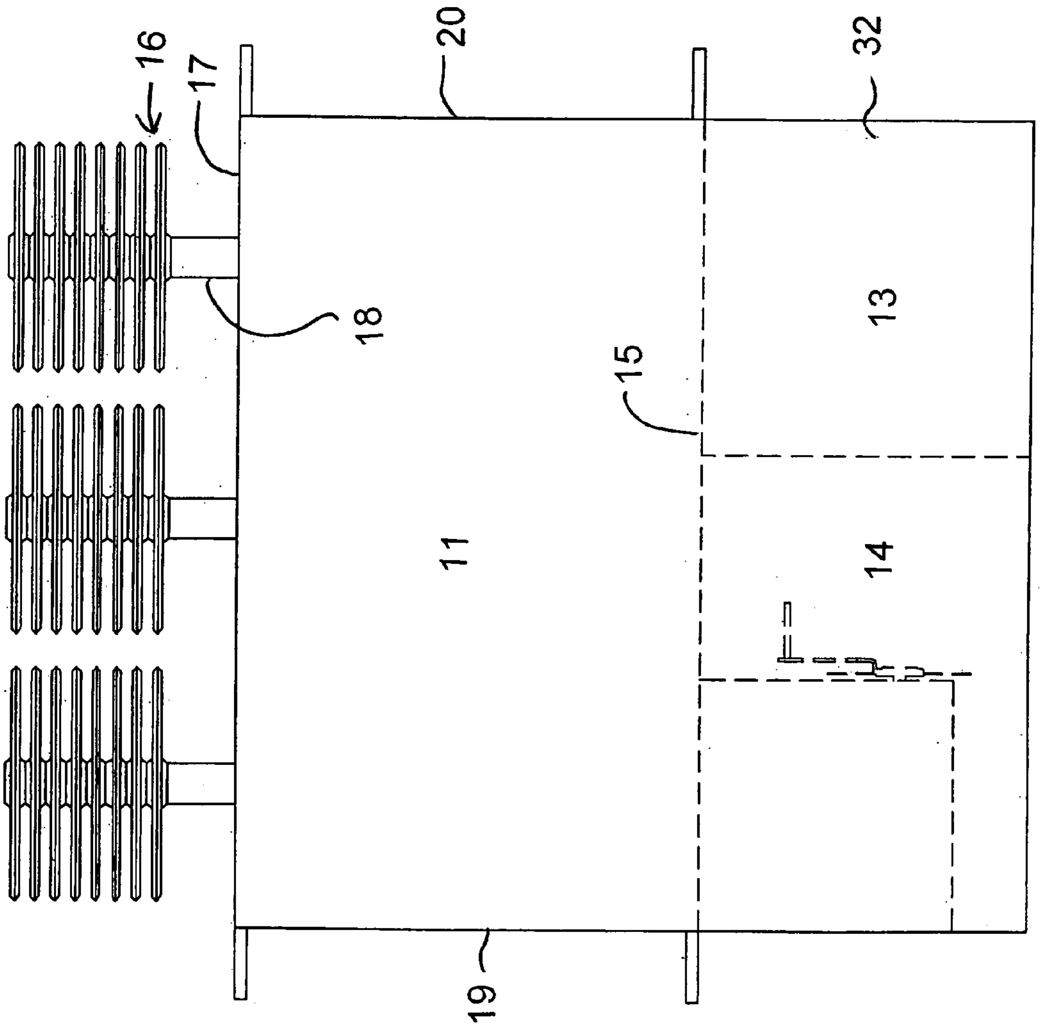
FIG. 2 is a top plan view of the apparatus of FIG. 1.

The apparatus comprises a housing 10 having a main transformer compartment 11, a first compartment 12, a second compartment 13 and a third compartment 14. The main transformer compartment 11 is mounted at the rear of the housing separated from the first, second and third compartments by a main vertical bulkhead 15. The main transformer compartment contains the transformer components which are of a construction well known to one skilled in the art. The transformer compartment 11 is filled with an insulating oil again of a conventional nature well known to one skilled in the art and includes an opening for filing and an opening for discharge of the oil as required. The transformer contains suitable windings and a tap switch which allows adjustment of the voltage. The oil is generally circulated using convection currents without the necessity for any moving pumps or the like. Cooling fins 16 are mounted on the rear of the housing outside of a rear wall 17 for communication of oil from the compartment 11 through ducts 18 to provide cooling by way of the cooling fins 16. Thus the compartment 11 is defined by side walls 19 and 20 of the housing together with the vertical dividing bulkhead 15 at the front and the rear wall 17 at the rear.

Figure 3:
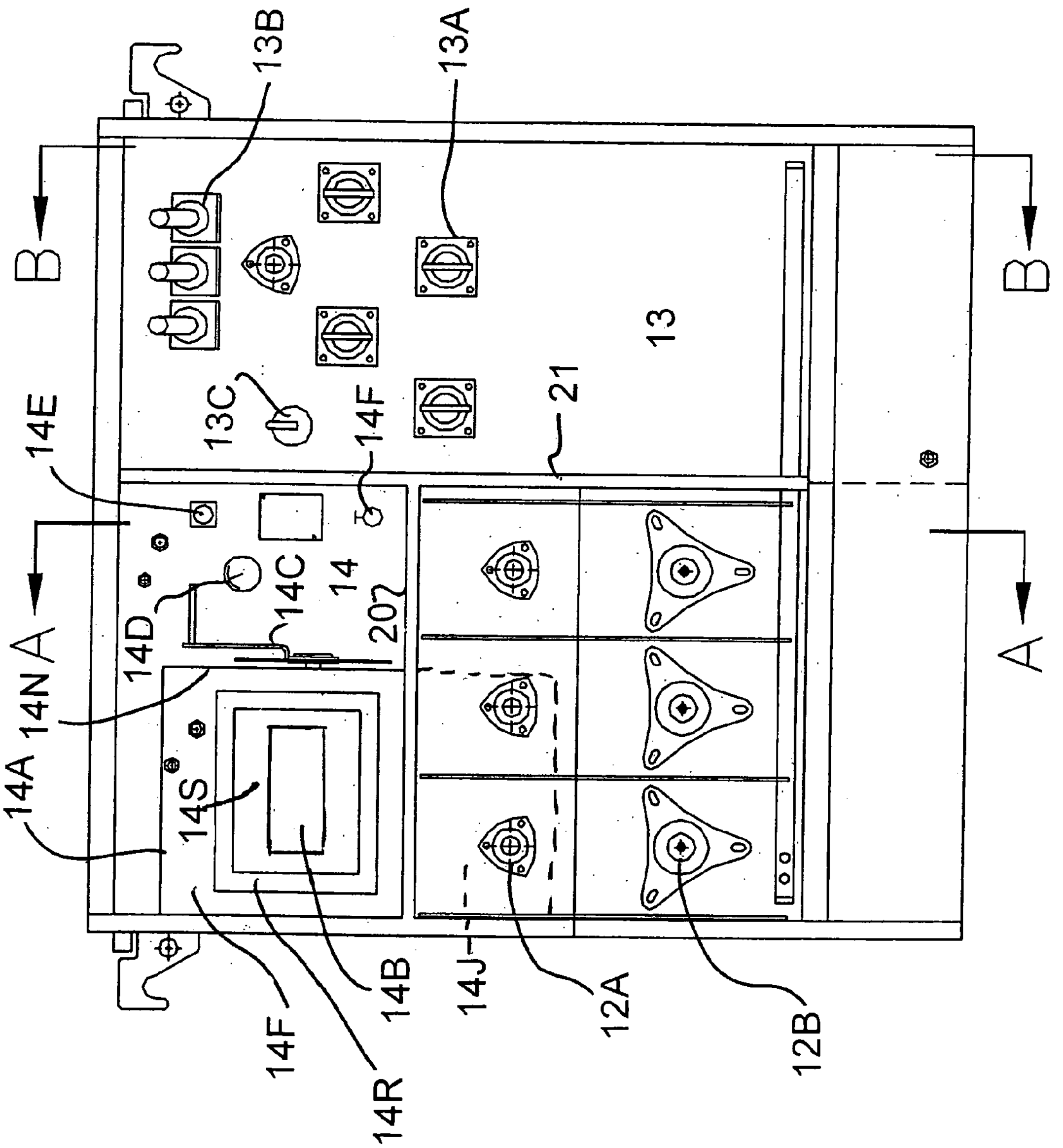
FIG. 3 is a front elevational view with the doors removed to show the internal components.
Figure 4:
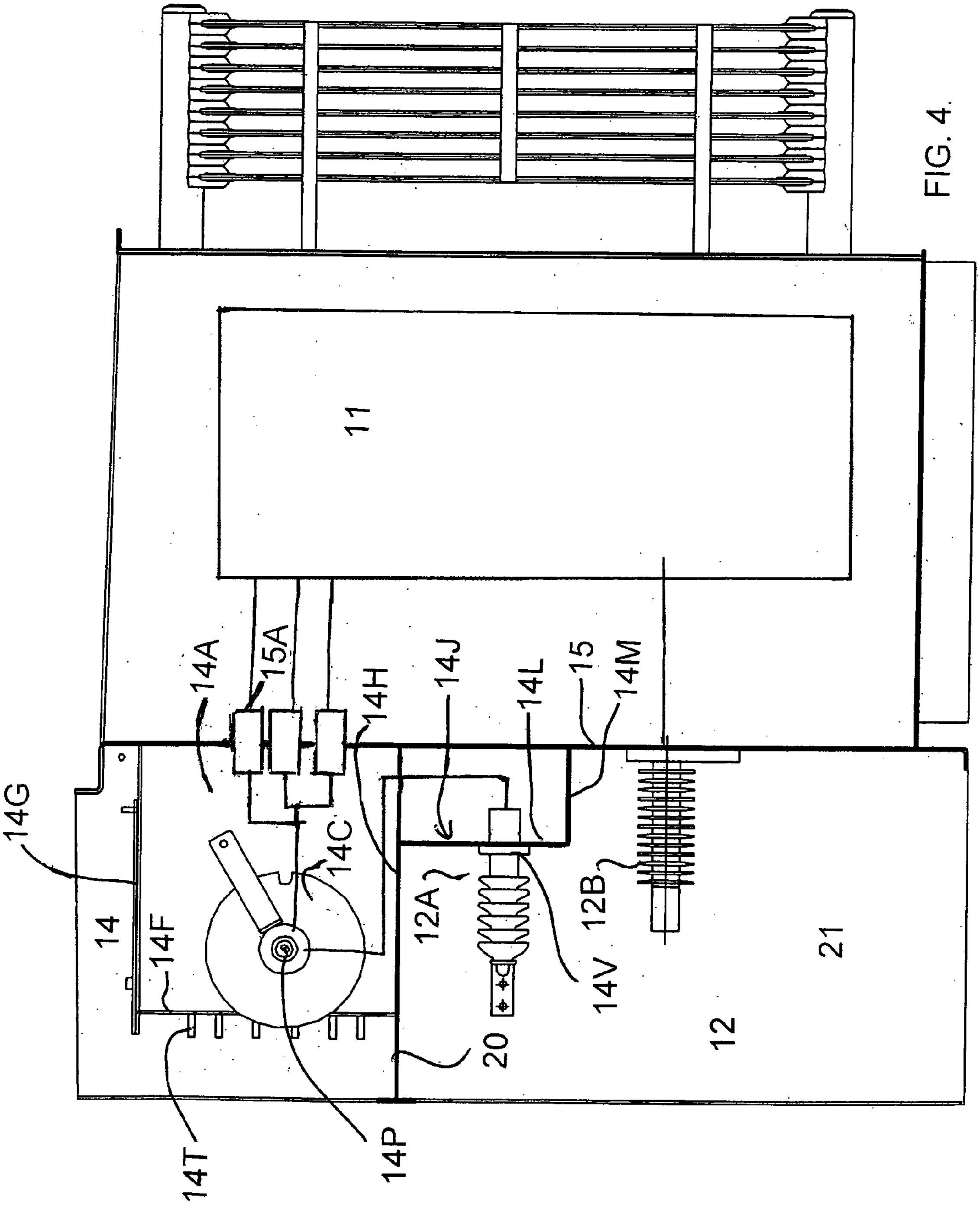
FIG. 4 is a cross sectional view along the lines A—A of FIG. 3.

The first compartment 12, as shown in FIGS. 3 and 4 contains input terminals 12A and lightning arresters 12B which are mounted in the compartment for connection to input lines carrying an input voltage. The three input terminals 12A are provided for three phase coupling. The lightning arresters and the terminals are of a construction well known to one skilled in the art.

Figure 5:
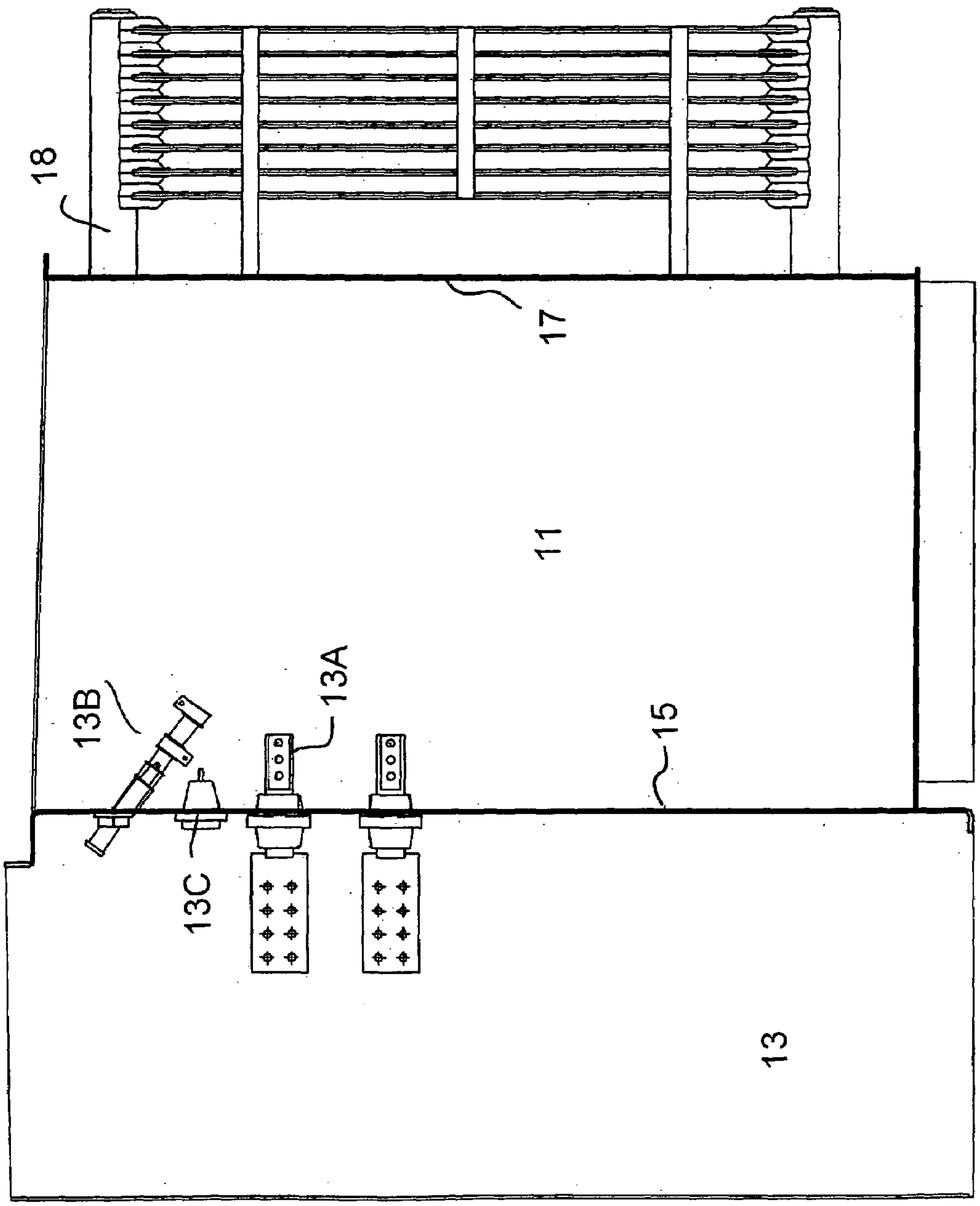
FIG. 5 is a cross sectional view along the lines B—B of FIG. 3.

The compartment 13 as best shown in FIGS. 3 and 5 carries output terminals 13A and fuses 13B. An adjustment 13C is provided which is operable in known manner to adjust the taps on the transformer for adjusting the voltage.

The compartment 14 as best shown in FIGS. 3 and 4 contains a switch compartment 14A housing a switch assembly 14B operable by a lever 14C on an exterior of the switch container 14A. The compartment 14 also contains gauges 14D and 14E for detecting the temperature and level/volume of the oil in the transformer compartment 11. A tap 14F allows oil from a compartment 11 to be tapped for further testing.

The switch container 14A as best shown in FIG. 4 has a front wall 14F a top wall 14G and a bottom wall 14H with a bottom wall being defined by the wall 20 dividing the compartment 14 from the compartment 12. Thus as shown best in FIG. 3, the compartment 14 is located directly above the compartment 12 with both being defined by a vertical bulkhead 21 which divides the compartments 12 and 14 from the compartment 13. The bulkhead 21 extends at right angles to the bulkhead 15. The switch container 14A is defined at its rear wall by the bulkhead 15. The switch container further includes a depending portion 14J which extends through the dividing wall 20 into a lower section defined by a front panel 14L and a bottom wall 14M. The lower compartment 14J extends across the full width of the switch container 14. The switch container 14A has a side wall 14N which separates it from the remainder of the compartment 14 containing the gauges for the transformer. The handle 14C is located on the side wall. The handle 14C is of a type which is rotatable around an axis 14P of the switch assembly 14B so as to move the contacts of the switch assembly from an open position to a closed position. Switches of this type are conventionally available and well known to one skilled in the art. The switches are contained within the switch container 14A and located within an insulating oil within the switch container 14A. The front wall 14F of the switch container includes a front panel 14R which has a surrounding flange and a central transparent panel 14S through which the contacts can be seen. The front panel is bolted into position on the front wall 14F by a series of bolts 14T.

The terminals 12A are mounted on the front wall 14L of the section 14J of the switch container. The switch container is wholly separated from the transformer compartment 11 so that the oil and the switch container is maintained wholly separate from the oil within the transformer compartment. This ensures that any formation of carbon within the switch compartment due to arcing of the switch when operating is not communicated into the oil in the transformer. For this purpose electrical connections between switch contacts 14B are provided through the bulkhead 15 by way of bushings 15A which again are a very well known construction to one skilled in the art. The bushings thus fasten to the bulkhead and provide an attachment to the bulkhead wall while allowing the conductor to pass through a hole in the bulkhead and sealing the hole. The bushings are of generally a ceramic nature which provides insulation through the oil to prevent arcing from the terminal at one end of the bushing to the grounded housing.

Similarly the terminals 12A for the input supply are also connected on the front wall 14J by a bushing 14V. Thus the connections from the input terminals 12A to the switch actuators 14B and to the transformer occur through the oil in the switch container 14A within the compartment 14.

The compartments 12, 13 and 14 are closed by the front doors 25, 26 and 27 respectively. The front door 25 is pivotal about hinges 25A and the door 27 is pivotal about hinges 27A both of which are mounted on the side wall 19 of the housing. The doors 25 and 27 are located one above the other meeting at a transverse line 28 so as to fully cover the front of the compartment 12 and 14 respectively. The door 26 is pivoted on hinges 26A on the side wall 20 of the housing. The height of the door 26 is equal to common height of the doors 25 and 27 so that all the doors extend from a bottom plinth 30 of the housing to a top 31 of the housing at which is provided an openable top cover 32. The openable top cover 32 allows access to the whole of the open top of the compartments 13 and 14 with the cover being pivotally mounted at or adjacent the bulkhead 15 so as to open the compartments 13 and 14 but leave the transformer compartment fully closed. It will be noted that the fuses 13B are of a nature which requires them to be mounted at an angle on the bulkhead 15 so that the opening of the top cover allows access to the inclined front section of the fuses.

The door 25 on the compartment 12 is maintained locked by a lock system 25B which is operable only by authorized utility personnel so that access to the input power is highly restricted and cannot be accessed by unauthorized persons at the site of the transformer. The door 14 has a lock system 14D which allows the door 14 to be opened readily by an authorized person at the transformer site. The compartment 14 contains no elements which are accessible and which are powered to the voltage of the system since the switch contacts 14B are located within the switch container 14A within the compartment 14 and thus are not accessible. The handle 14C is not directly connected to any voltage and thus can be manually grasped by an operator without the necessity for insulated poles or the like. Thus the various components within the compartment 14 are readily accessible by trained authorized persons at the site. The switch arm 14B has a switch system which includes a lock so that when the switch is moved to the open position, the open contacts can be viewed by the authorized person to see that the opening action has occurred to ensure that power is then disconnected from the transformer and via the transformer to the output terminals within the compartment 13. Thus with the switch arm in the open position of the contacts, the contacts can be viewed and in this position the lock allows the system to remove a key from the interlock system with that key actuating a lock 26B of the door 26 of the compartment 13 allowing access to the interior of that compartment and to the adjustments and terminals therein. This access is only allowed when the switch contacts are moved to the open condition and the interlock key thus removed. Moving of the contacts to the closed position can only occur after the door 26 and cover 32 is again closed and the key removed from the lock 26B for accessing and operating the arm 14B.

The use of the insulating oil within the switch container allows the construction of the switch in a relatively small area and maintains the contacts insulated and effective. The oil in the switch compartment is however maintained entirely separate from the oil in the transformer to insure that no contamination is transferred from the switch contact to the transformer.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. A transformer comprising:

a housing having a main transformer compartment, a first compartment, a second compartment and a third compartment, where each of the compartments is maintained separately from each of the others;

each of the first, second and third compartments having a separate manually openable cover which can be opened to provide access to an interior of the respective compartment;

input terminals mounted in the interior of the first compartment of the housing and covered by the cover thereof for receiving an input voltage from a supply;

output terminals mounted in the interior of the second compartment of the housing and covered by the cover thereof for providing an output voltage to a load;

a transformer assembly mounted in the main transformer compartment of the housing for converting the input voltage to the output voltage;

a switch assembly mounted in the interior of the third compartment and covered by the cover thereof for switching off and on supply of power from the input terminals to the transformer assembly to switch off and on supply of voltage to the output terminals;

the main transformer compartment including an insulating liquid bath for the transformer assembly;

the switch assembly including switch contacts mounted within a switch container located within the third compartment and a manually operable member for moving the switch contacts between open and closed positions located within the third compartment outside the switch container;

the switch container having a transparent window in a wall thereof through which the contacts can be observed from a location outside the housing through the cover of the third compartment when the cover is opened;

the switch container containing an insulating liquid bath for the switch contacts;

the switch container being separated from the transformer compartment by at least one bulkhead such that the insulating liquid bath of the switch container is maintained separate from the liquid switch bath of the transformer.

2. The transformer according to claim 1 wherein there is provided a bulkhead between the switch container and the transformer compartment which defines the switch container on one side and the transformer compartment on the other side with a bushing through the bulkhead to which a connecting cable is attached from the switch contacts and a connecting cable is attached from the transformer.

3. The transformer according to claim 2 wherein the bulkhead is vertical.

4. The transformer according to claim 1 wherein the input terminals are mounted on a bulkhead of the switch compartment with a bushing extending through bulkhead, a first electrical connector extending from the input terminals and a second electrical connector extending through the switch compartment from the bushing to the switch contacts.

5. The transformer according to claim 4 wherein the bulkhead is vertical.

6. The transformer according to claim 2 wherein the input terminals are mounted on a bulkhead of the switch compartment with a bushing extending through the bulkhead, a first electrical connector extending from the input terminals and a second electrical connector extending through the switch compartment from the bushing to the switch contacts and wherein the bulkhead of the switch compartment on which the input terminal are mounted is parallel to the bulkhead between the switch compartment and the transformer compartment and spaced therefrom.

7. The transformer according to claim 1 wherein there are no live electrical components in the third compartment so that the manual operable member can be grasped manually.

8. The transformer according to claim 1 wherein the cover on the second compartment is interlocked with the switch contacts such that the cover can be opened and maintained open only with the switch contacts in the open condition.

9. The transformer according to claim 1 wherein the second and third compartments are arranged side by side.

10. The transformer according to claim 9 wherein each of the second and third compartments includes a top lift cover which is interlocked with the switch contacts such that the top lift cover can be opened and maintained open only with the switch contacts in the open condition.

11. The transformer according to claim 1 wherein there are provided control elements for the transformer which are located in the second compartment.

12. The transformer according to claim 1 wherein the manual operable member is mounted on a side wall of the switch container within the third compartment.

13. The transformer according to claim 1 wherein a front panel of the switch compartment comprises a panel bolted onto an open front face of the switch compartment, the panel having a transparent window formed therein.

* * * * *